No. 659,304. Patented Oct. 9, 1900.
E. M. KING.
CONVERTIBLE PLANTER AND FERTILIZER DISTRIBUTER.
(Application filed May 14, 1900.)
(No Model.)
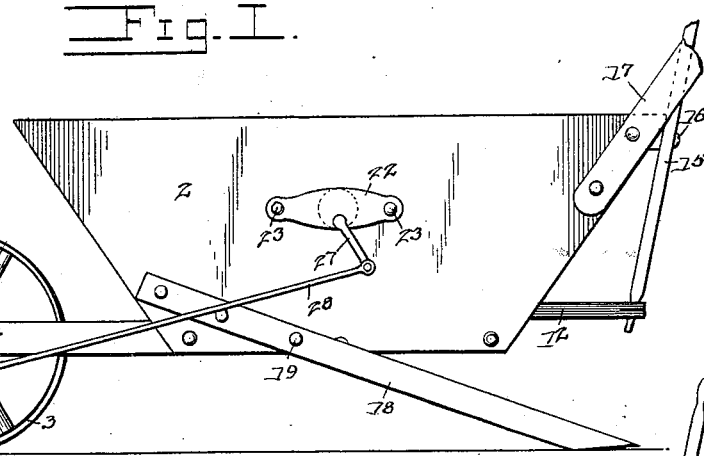
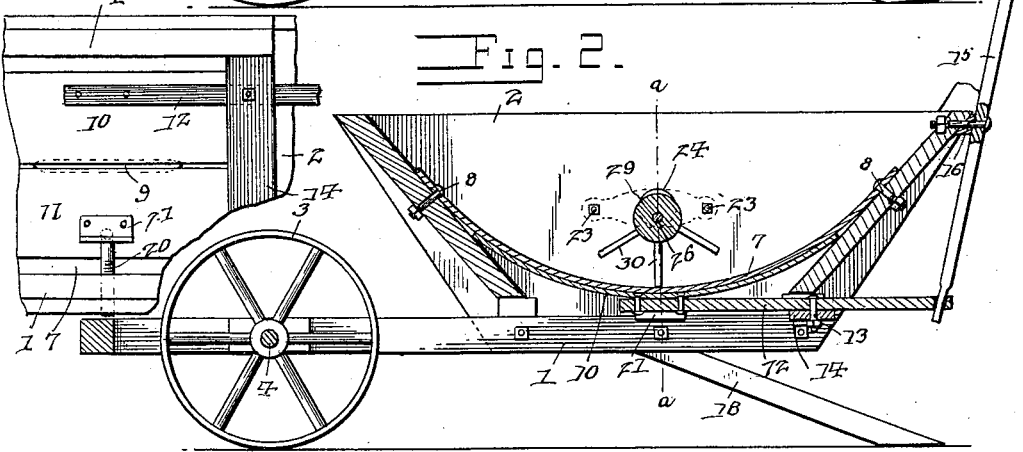
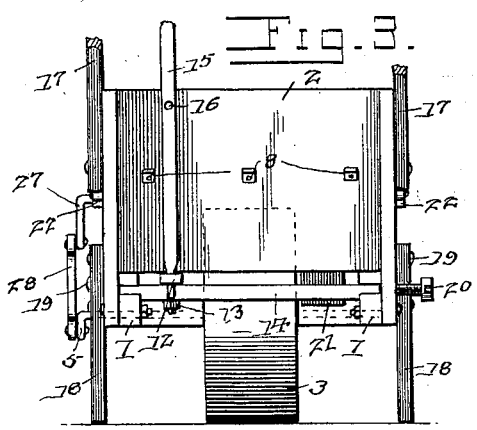
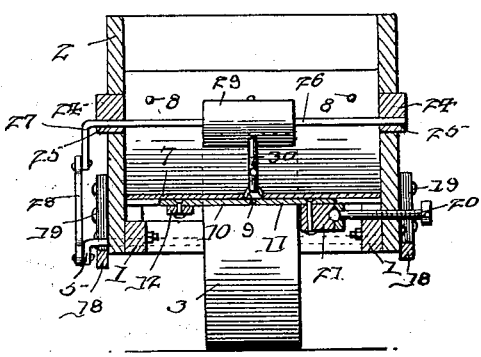
Witnesses
F. E. Alden
J. W. Garner
E. M. King Inventor
By C. A. Snow & Co.
Attorneys
THE NORRIS PETERS CO., PHOTO-LITHO., WASHINGTON, D. C.

UNITED STATES PATENT OFFICE.

EARLY M. KING, OF ARIOSTO, ALABAMA.

CONVERTIBLE PLANTER AND FERTILIZER-DISTRIBUTER.

SPECIFICATION forming part of Letters Patent No. 659,304, dated October 9, 1900.

Application filed May 14, 1900. Serial No. 16,651. (No model.)

*To all whom it may concern:*

Be it known that I, EARLY M. KING, a citizen of the United States, residing at Ariosto, in the county of Dale and State of Alabama, have invented a new and useful Convertible Planter and Fertilizer-Distributer, of which the following is a specification.

My invention is an improved convertible planter and fertilizer-distributer, one object of my invention being to provide means whereby the planter may be adapted for planting seeds or distributing fertilizer at will.

Another object of my invention is to provide means for gaging the quantity of seeds or fertilizer discharged from the hopper.

My invention consists in the construction and combination of devices hereinafter fully set forth, and pointed out in the claims.

In the accompanying drawings, Figure 1 is a side elevation of a convertible planter and fertilizer-distributer embodying my improvements. Fig. 2 is a vertical longitudinal sectional view of the same. Fig. 3 is a rear elevation of the same. Fig. 4 is a transverse sectional view of the same taken on the line *a a* of Fig. 2. Fig. 5 is a detail bottom plan view.

The frame of the planter comprises the side bars 1 and the hopper 2, which is secured between the side bars, either as here shown or in any other suitable manner. An operating-wheel 3 is disposed between the side bars 1, near the front ends thereof, and has its shaft 4 journaled in bearings formed in said side bars, and the said shaft is provided at one end with a crank 5. The front and rear sides of the hopper 2 are inclined and converge downwardly, as shown. A curved plate 7 forms the bottom of the hopper and the ends thereof are secured to the inclined front and rear sides 6 of the hopper, either by bolts 8, as here shown, or in any other suitable manner, and the said bottom plate is provided with a longitudinally-disposed discharge-opening 9 in its lower side. A cut-off plate 10 and gage-plate 11 are disposed on opposite sides of the discharge-opening 9. Said cut-off and gage plates are curved longitudinally, adapted to the contour of the curved bottom plate 7 of the hopper, and bear against the same, and the ends of said cut-off and gage plates are guided and sustained between said bottom plates 7 and the opposing front and rear inclined side walls 6 of the hopper, as shown in Fig. 2. To the center of the cut-off plate is secured the front end of an operating-lever 12, the said lever being fulcrumed, as by a bolt 13, on a cross-bar 14, which connects the side bars 1 of the frame, and to the rear end of said lever 12 is connected the lower end of a hand-lever 15, which is fulcrumed to the rear side of the hopper, as by a bolt 16. The said hand-lever extends upward between the handles 17, which are similar to plow-handles, and are attached to the sides and project rearwardly from the hopper. Supporting-bars 18 are attached to the sides of the hopper by bolts or otherwise, as at 19, and extend rearward and incline downward from the hopper and are adapted to stir the soil on opposite sides of the furrow, and thereby cover the seeds or fertilizer, as will be understood. If preferred, suitable covering devices may be employed in connection with the said bars 18 and secured thereto.

An adjusting rod or bolt 20 operates in a threaded opening in one side of the hopper below the bottom plate thereof, and said adjusting bolt or rod is connected at its inner end to the gage-plate 11 through a block 21, which is bolted to said gage-plate or in any other suitable manner, as may be preferred, the function of the said adjusting-bolt 20 being to adjust the gage-plate with relation to the discharge-opening 9 in such manner as to regulate the quantity of seed or fertilizer that may be discharged from the hopper at a single operation of the cut-off plate 10 by varying the size of the uncovered portion of said discharge-opening, as may be required.

Bearing-plates 22 are secured on the sides of the hopper by bolts, as at 23, and said bearing-plates have circular bosses or offsets 24, which project inwardly from their inner sides and extend through circular openings 25 in the sides of the hopper. Openings extend eccentrically through the said bearing-plates and bosses or offsets, in which openings a rock-shaft 26 is journaled. Said rock-shaft is provided at one end with a crank 27, which is connected to the crank 5 by a pitman 28. It will be understood that the said pitman communicates rocking motion to the rock-shaft 26 from the revolving crank-shaft 4. A stirrer 29 is fast on the rock-shaft 26 and is provided on one side with radial stirring-teeth 30, which operate in the lower portion of the hopper above the discharge-opening 9 thereof and the function of which, as will be understood, is to stir and agitate the seeds or fertilizer in the hopper and cause the same to pass readily through the discharge-opening 9 when the said opening is uncovered by the plate 10. The bearing-plates 22 are reversible on the sides of the hopper and are adapted to be secured thereon either in the position indicated by the drawings, in which the eccentrically-disposed openings therein are on the lower sides thereof, in which case the stirrers 30 extend substantially to the bottom of the hopper, or the said bearing-plates may be so disposed and secured on the sides of the hopper that the eccentrically-disposed openings therein will be near the upper sides thereof, in which disposition of the bearing-plates the shaft 26 will be supported in a higher position in the hopper, and hence the stirring-teeth 30 will not so closely approach the bottom of the hopper. When the shaft 26 and the stirrers thereon are disposed in the position shown in the drawings, the stirring-teeth 30 by coaction with the sides of the discharge-opening 9 in the bottom of the hopper will serve to break up lumps and compacted particles of the fertilizer and cause the same to readily pass through the discharge-opening, as will be understood.

Having thus described my invention, I claim—

1. In a planter, the combination with the hopper, of the reversible bearing-plates on the side thereof, having the eccentrically-disposed openings and the stirrer having its shaft journaled in said openings, substantially as described.

2. In a planter, the hopper having the inclined end walls and the curved bottom plate provided with a discharge-opening, the cut-off plate movable transversely under the bottom plate and having its ends disposed between the latter and the end walls of the hopper, the said bottom plate and the end walls of the hopper forming the guides for the cut-off plate, and the operating-lever attached to the center of the cut-off plate, substantially as described.

3. In a planter the hopper having the inclined end walls and curved bottom plate provided with a discharge-opening, the coacting curved cut-off plate and gage-plate movable transversely under the bottom plate of the hopper and having their ends disposed between the latter and the end walls of the hopper, the said bottom plate and said end walls of the hopper forming the guides for the said cut-off and gage plates, the operating-lever attached to the center of the cut-off plate, and the adjusting-bolt, operating in one side of the hopper and connected to the center of the said gage-plate, substantially as described.

In testimony that I claim the foregoing as my own I have hereto affixed my signature in the presence of two witnesses.

EARLY M. KING.

Witnesses:
W. P. WINDHAM,
G. P. DOWLING.